US008774804B2

(12) United States Patent
Moses et al.

(10) Patent No.: US 8,774,804 B2
(45) Date of Patent: Jul. 8, 2014

(54) CONTEXT-RETENTION CONTROLLER AND METHOD FOR CONTEXT RETENTION IN WIRLESS ACCESS NETWORKS

(75) Inventors: Danny Moses, Reut (IL); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 173 days.

(21) Appl. No.: 13/531,111

(22) Filed: Jun. 22, 2012

(65) Prior Publication Data
US 2013/0165118 A1    Jun. 27, 2013

Related U.S. Application Data

(60) Provisional application No. 61/553,647, filed on Oct. 31, 2011.

(51) Int. Cl.
*H04W 4/00* (2009.01)
*H04B 1/38* (2006.01)
*H04B 1/04* (2006.01)

(52) U.S. Cl.
USPC ............... 455/435.1; 455/574; 455/127.5

(58) Field of Classification Search
USPC .................... 455/435.1, 574, 127.5
See application file for complete search history.

(56) References Cited

U.S. PATENT DOCUMENTS

2006/0084417 A1* 4/2006 Melpignano et al. ......... 455/418

* cited by examiner

*Primary Examiner* — Joel Ajayi
(74) *Attorney, Agent, or Firm* — Schwegman, Lundberg & Woessner, P.A.

(57) ABSTRACT

Embodiments of a context-retention controller and method for retaining context in a wireless access network are generally described herein. In some embodiments, the context-retention controller may assign a context identifier to a mobile device at network entry for context retention. A disconnection and context-retention request may be received from a base station to trigger entry of the mobile station into a context-retention mode. The base station may generate the disconnection and context-retention request upon an indication of a disconnection of the mobile device from the wireless access network. The context-retention controller may maintain context for the mobile device in a context-retention database after disconnection of the mobile device from the wireless access network.

17 Claims, 4 Drawing Sheets

CONTEXT-RETENTION CONTROLLER AND METHOD FOR CONTEXT RETENTION IN WIRLESS ACCESS NETWORKS

PRIORITY CLAIM

This application claims priority to U.S. Provisional Patent Application Ser. No. 61/553,647, filed Oct. 31, 2011, which is incorporated herein by reference in its entirety.

TECHNICAL FIELD

Embodiments pertain to wireless access networks including WiMAX mobile broadband networks that may be configured in accordance with an IEEE 802.16m standard and 3GPP LTE mobile broadband networks configured in accordance with a UTRAN standard. Some embodiments relate to context retention for a mobile device after disconnection or deregistration from a wireless access network. Some embodiments relate to advanced power conservation techniques in mobile devices.

BACKGROUND

In order for a mobile device to be able to use network resources of a wireless access network for communication, the mobile device may perform various operations including initial network entry, radio configuration, registration and allocation of network resources. These operations are performed by accessing the base-station and exchanging various management messages. The base station may also exchange management messages with other network components to establish the appropriate services. Unfortunately, the network-entry process takes a considerable amount of time that may reach several seconds or more. After network entry, a mobile device may disconnect from the network (e.g., for power conservation or another reason) or may be disconnected from the network (e.g., due to radio-link failure). The lengthy network entry process may need to be performed again for network reentry.

Another issue with mobile devices is power consumption. Because mobile devices are equipped with a limited amount of battery power, it may be important to provide efficient power management mechanisms in mobile broadband networks such as mobile WiMAX and 3GPP LTE networks that enable always on connectivity.

Thus there are general needs for mobile devices and methods that help reduce the amount of time it takes for a mobile device to re-enter a network after disconnecting or being disconnected from the network. There are general needs for mobile devices and methods that help reduce the amount of time it takes for a mobile device to re-enter a network after being in a power savings state. There are general needs for network devices and methods that help reduce power consumption in mobile devices. There are general needs for mobile devices and methods that help reduce the amount of network resources allocated to mobile devices.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
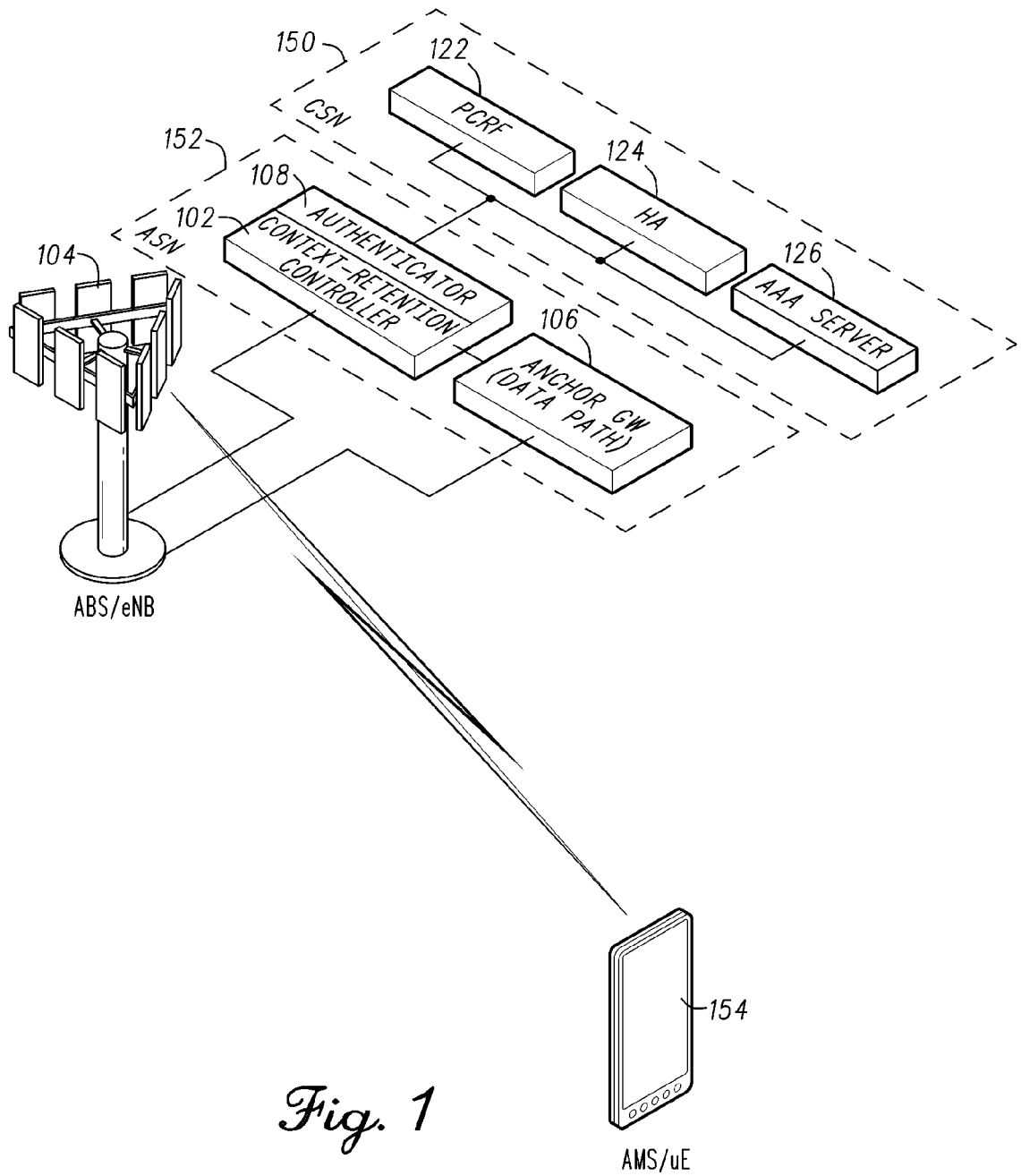
FIG. 1 illustrates various elements of a wireless network in accordance with some embodiments.

FIG. 1 illustrates various elements of a wireless access network in accordance with some embodiments. The wireless access network may include an access service network (ASN) 152 that includes one or more base stations, such as base station 104, that provide communication services to mobile devices, such as mobile device 154. The wireless access network may also include a core service network (CSN) 150 that serves one or more ASNs, such as ASN 152.

In the example embodiments illustrated in FIG. 1, the ASN 152 may include context-retention controller 102, an authenticator 108 and an anchor gateway (GW) 106, among other things. The CSN 150 may include a policy and charging rules function (PCRF) 122, a home agent (HA) 124 and an authentication, authorization, and accounting (AAA) server 126, among other things.

In accordance with embodiments, the context-retention controller 102 may assign a context identifier to a mobile device 154 at network entry for context retention and may maintain context for the mobile device 154 after disconnection from the wireless access network. The context-retention controller 102 may identify the mobile device 154 by the assigned context identifier for retrieval of the context at network reentry of the mobile device 154.

Accordingly, the mobile device 154 does not need to go through the entire network entry process at network entry. Furthermore, the amount of time it takes for the mobile device 154 to re-enter the network may be significantly reduced.

In some embodiments, the context-retention controller 102 may operate within the ASN 152 as illustrated in FIG. 1. In these embodiments, the context-retention controller 102 may serve all mobile devices that connect to the ASN 152. In these embodiments, when a mobile device moves from a geographical area served by one ASN to that of a different ASN, the context of the mobile device may be handed over between the context-retention controllers of different ASNs.

In some other embodiments, the context-retention controller 102 may operate within the CSN 150 and may serve some or all mobile devices that connect to each ASN 152 under the CSN 150. In these embodiments, the context-retention controller 102 may serve several ASNs 152. Since the context-retention controller 102 may be located in the CSN 150, when mobile devices move from a geographical area of one ASN to that of a different ASN, the context of the mobile device does not need to be handed over between ASNs 152 since the context-retention controller operates within the CSN 150.

In some embodiments, the context-retention controller 102 may be co-located with an authenticator 108 (as illustrated) although this is not a requirement. In some embodiments, the context-retention controller 102 and the authenticator 108 may be part of a control plain of the ASN 150.

In some other embodiments, the context-retention controller 102 may be a separate component in the ASN 152. In these embodiments, a single context-retention controller 102 may interface with the several authenticators 108 of the ASN 152.

These embodiments may be useful when the ASN 152 contains several authenticators 108 allowing a single context-retention controller to interface with several authenticators 108.

In some embodiments, the anchor gateway 106 may support data path functions in the ASN 152 and may interact with the context-retention controller 102. One or more base stations 104 may communicate with mobile devices within the geographic region served by the ASN 152.

In some embodiments, the context-retention controller 102 may maintain the context for the mobile device 154 either when the mobile device is disconnected unintentionally from the wireless access network or when the mobile device disconnects intentionally from the wireless access network. As described in more detail below, disconnection from the wireless access network may trigger the context-retention controller 102 to retain context.

In some embodiments, the context-retention controller 102 may maintain the context for the mobile device 154 when the mobile device is disconnected unintentionally from the wireless access network due to radio-link failure or due to network unavailability. In some embodiments, the context-retention controller 102 may maintain context for the mobile device 154 when the mobile device disconnects intentionally from the wireless access network to enter into a power management mode (e.g., a lower-power state to conserve energy). In some embodiments, the context-retention controller 102 may maintain context for the mobile device 154 when the mobile device is disconnected from the wireless access network due to network unavailability. In some embodiments, the context-retention controller 102 may maintain context for the mobile device 154 when the mobile device disconnects intentionally from the wireless access network for use of an alternate network (e.g., a Wi-Fi network, another wireless access or cellular network or a wired network).

In these embodiments, the context-retention controller 102 maintains the context for the mobile device 154 while the mobile device is disconnected from the wireless access network. In some embodiments, the mobile device 154 may send a de-registration request to the base station 104 when the mobile device 154 intends to disconnect from the wireless access network, although the scope of the embodiments is not limited in this respect.

In these embodiments, the context-retention controller 102 retains the context of the mobile device whenever the mobile device 154 disconnects or is disconnected from the wireless access network. One trigger for disconnection is when the mobile device 154 enters a state of low power to conserve power (e.g., a particular power management mode). Other triggers may include radio-link loss (e.g., when the mobile device entering a geographical location in which the radio link is lost or service is unavailable). In this situation, the mobile device 154 may use alternative network connections until the radio link is available again. In these embodiments, retaining the context for the mobile device 154 enables a fast switch back to a cellular-based connection of the wireless access network. In some embodiments, when the transceiver of the mobile device 154 is turned-off, the mobile device 154 may be configured to send a de-registration request to the base station 104, although the scope of the embodiments is not limited in this respect.

In some embodiments, context retention may be an optional service provided by the network service provider allowing subscribers the option of purchasing a context-retention service.

In some embodiments, the context may include predetermined device parameters and authentication information to enable faster network re-entry. In some embodiments, groups of related parameters may be retained. In some embodiments, the device parameters may be specifically selected to enable faster network re-entry. In some embodiments, the groups of related parameters may include radio attributes/configuration, antenna modes, uplink/downlink streams, and/or authentication parameters, although the scope of the embodiments is not limited in this respect.

In some embodiments, the context retained by the context-retention controller 102 may include one or more of Combined Resource Indicator, CS Type, SBC Context, Maximum Transmit Power, Security Negotiation Parameters, Authorization Policy Support, MAC Mode, PN Window Size, OFDMA SS FFT Sizes, CAPABILITY_INDEX, DEVICE_CLASS, CLC Request, Long TTI for DL, UL sounding, OL Region, DL resource metric for FFR, Max. Number of streams for SU-MIMO in DL MIMO, Max. Number of streams for MU-MIMO in MS point of view in DL MIMO, DL MIMO mode, feedback support for DL, Subband assignment A-MAP IE support, DL pilot pattern for MU MIMO, Number of Tx antenna of AMS, Max. Number of streams for SU-MIMO in UL MIMO(1/2/3/4), Max. Number of streams for MU-MIMO in MS point of view in UL MIMO(1/2/3/4), UL pilot pattern for MU MIMO, UL MIMO mode, Modulation scheme, UL HARQ buffering capability, DL HARQ buffering capability, AMS DL processing capability per sub-frame, AMS UL processing capability per sub-frame, FFT size(2048/1024/512), Authorization policy support, Inter-RAT Operation Mode, Supported Inter-RAT type, MIH Capability Supported, Visited NSP ID, REG Context, Classification/PHS Options and SDU Encapsulation Support, Maximum Number of Classifier, PHS Support, MAXIMUM_ARQ_BUFFER_SIZE, MAXIMUM_NON_ARQ_BUFFER_SIZE, Multicarrier capabilities, Zone Switch Mode Support, Capability for supporting A-GPS Method for LBS service, Interference mitigation supported, E-MBS capabilities, Channel BW and Cyclic prefix, frame configuration to support legacy R1.0, Persistent Allocation support, Group Resource Allocation support, Co-located coexistence capability support, HO Trigger Metric Support, EBB Handover support, Minimal HO Reentry Interleaving Interval, Capability for sounding antenna switching support, Antenna configuration for sounding antenna switching, ROHC support, Host-Configuration-Capability-Indicator, AMS initiated aGP Service Adaptation Capability. Each context item may be associated with a TLV, although this is not a requirement.

In some embodiments, an indication of disconnection of the mobile device 154 may includes either receipt of a deregistration request from the mobile device 154 by the base station 104 or upon a determination of radio link failure by the base station 104. In some of these embodiments, the base station 104 may respond to the deregistration request from the mobile device 154 with a deregistration response message and may receive a deregistration acknowledgement message from the mobile device.

In some embodiments, the context-retention controller 102 may be a Deregistration with Context Retention (DCR) mode controller that is to maintain context for the mobile device 154 after deregistration of the mobile device 154 when the mobile station enters into the context-retention mode. In these embodiments, the mobile device 154 may trigger context retention by sending a DCR request. In some embodiments, the context-retention mode may be a power management (PM) mode for energy consumption. As discussed above, context retention may be triggered for both power management events as well as non-power management events.

In some WiMAX embodiments, the context-retention controller may be DCR mode controller and the context identifier may be context retention identifier (CRID). The DCR mode controller may maintain the context for the mobile device after the mobile device enters DCR mode. In these embodiments, the CRID may be used by a WiMAX network for matching the retained context to an associated mobile device, such as mobile device 154. In some embodiments, each mobile device may be assigned a unique CRID that is registered with the network at network entry, although the scope of the embodiments is not limited in this respect. In these WiMAX embodiments, the base station 104 may be an advanced base station (ABS) and the mobile device 154 may be an advanced mobile device (AMS), although the scope of the embodiments is not limited in this respect.

In some 3GPP LTE embodiments, the context-retention controller 102 may operate as part of a Discontinuous Reception (DRX) mode controller and the context-retention mode may include a DRX mode. In these embodiments, the mobile device 154 may be user equipment (UE) and the DRX mode controller may maintain the context for the UE until after the UE enters DRX mode. In DRX mode, the UE may be in an idle mode or idle state in order to minimize the power consumption during which the UE is not required to listen continuously to the amount of information provided by the wireless access network. In some embodiments, the UE may be in a low-power consumption mode.

In accordance with some embodiments, during initial/regular network entry (when no context had been retained), the mobile device 154 and base station 104 may exchange messages to establish various attributes and parameters to be used for optimal connection. During context-retention mode, on the other hand, no such message exchange is performed because the mobile device 154 stores the context before disconnecting (either intentionally or unintentionally) from the network and the base-station 104 obtains the retained context information from the context-retention controller 102 at network reentry.

In some embodiments, the context identifier may include a base-station identifier (BSID) that identifies a base station 104 to which the mobile device 154 was connected and a mobile device identifier field that uniquely identifies the mobile device 154 among other mobile devices associated with the BSID. In some embodiments, the context identifier may be a 72-bit identifier although the scope of the embodiments is not limited in this respect.

In some embodiments, the context-retention controller 102 may generate the context identifier when the mobile device 154 initially connects to (or registers with) the wireless access network and may provide the context identifier to the mobile device 154. The context-retention controller 102 may receive the context from the base station 104 or other network element and may store the context in a context-retention database. The context-retention database may associate context for a mobile device 154 with a context identifier for the mobile device.

In some embodiments, the base station 104 or other network element may determine the context for the mobile device 154 after the mobile device 154 initially connects to and registers with the wireless access network. The context-retention controller 102 may also receive updates to the context from the base station 104 or other network element while the mobile device 154 is connected to the wireless access network. In this way, the most up-to-date context for a mobile device may be retained so that it is stored when the mobile device disconnects or is disconnected from the wireless access network. In these embodiments, the context identifier may be stored by both the context-retention controller 102 and mobile device 154. In some embodiments, the mobile device 154 may also store and retain at least some of its context including its state when it enters into a context-retention mode (e.g., a power management mode and/or when disconnects or is disconnected from the wireless access network). When the mobile device 154 connects or reconnects to the network, the mobile device 154 may use the stored state and/or context to determine if the mobile device 154 is exiting context-retention mode (re-entering the network) or if the mobile device 154 is initially connecting to the network.

In some embodiments, the mobile device 105 may use context-retention mode to switch between two types of wireless services (i.e., a cellular broadband service such as LTE or WiMAX and a Wi-Fi service). For example, if the subscriber is on the move and is entering a place where Wi-Fi service is provided by the same operator, the mobile device 154 may enter context-retention mode and switch over to Wi-Fi (if supported). In these embodiments, the HA 124 may be triggered to support the continuation of the service through the Wi-Fi network. When the mobile device 154 leaves the zone supplying Wi-Fi service, and the mobile device 154 may reconnect to the cellular service and the HA 124 may be triggered to transition back to cellular service provided by the wireless access network. In these embodiments, information may be obtained information from the AAA server 126.

In some embodiments, the context-retention controller 102 comprises processing circuitry to assign a context identifier to a mobile device at network entry for context retention, and interface circuitry to receive a disconnection and context-retention request from the base station 154 to trigger entry of the mobile station into a context-retention mode. In these embodiments, the processing circuitry may maintain context for the mobile device in a context-retention database after disconnection of the mobile device from the wireless access network. The interface circuitry may receive a context-retention mode exit request message from the base station that includes the context identifier for retrieval of the context at network reentry.

Figure 2:
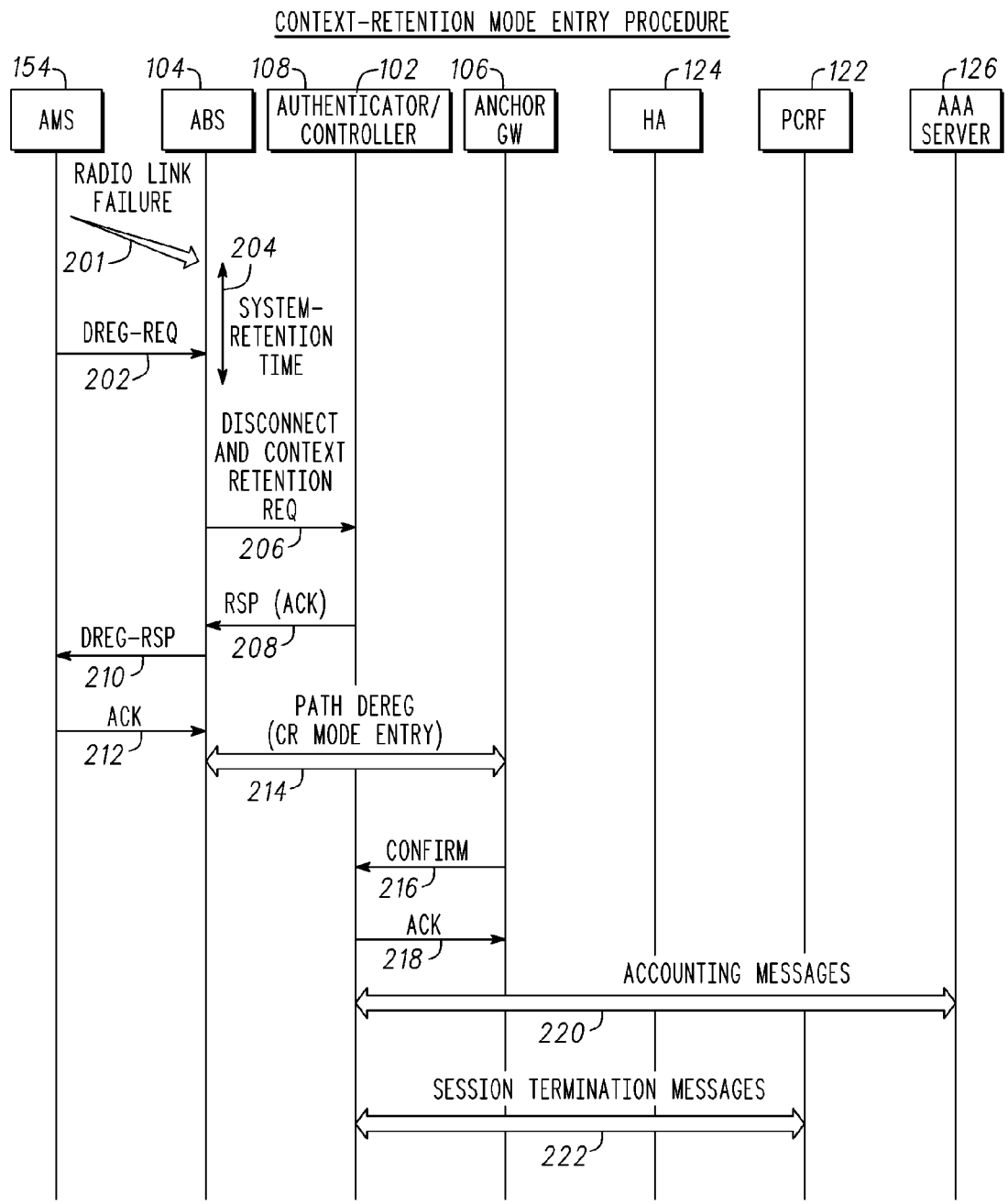
FIG. 2 is a context-retention mode entry procedure in accordance with some embodiments.

FIG. 2 is a context-retention mode entry procedure in accordance with some embodiments. Context-retention mode entry procedure 200 is a call flow that illustrates an exchange of messages between various network components upon the entry of a mobile device 154 (FIG. 1) to context-retention mode.

With deregistration request message 202, the mobile device 154 may signal its desire to enter context-retention mode. In some embodiments, a context-retention flag may be set in request message 202 to indicate to the base station 104 that the mobile device 154 is entering a context-retention mode. In some embodiments, the mobile device 154 may signal its desire to enter DCR mode by issuing an advanced-air interface (AAI) deregistration (DREG) request (REQ) (AAI-DREG-REQ) management message with a DCR flag. In some embodiments, the mobile device 154 may switch off its radio or transceiver to trigger entry context-retention mode. In some embodiments, when the transceiver of the mobile device 154 is turned-off, the mobile device 154 may be configured to send a de-registration request 202 to the base station 104 before turning off.

In some embodiments, other events, such as a radio link failure 201 may trigger entry into context-retention mode. In some embodiments, the base station 104 may wait a predetermined period of time to determine if the mobile device 154 has switched off its radio or has experienced radio link failure. During this time, the base station 104 may attempt to detect transmissions from the mobile device 154. In some embodiments, the base station 104 may wait a predetermined period of time, such as context-retention time 204, although the scope of the embodiments is not limited in this respect. In these embodiments, the context-retention controller 102 may maintain the context for the mobile device 154 for at least a predetermined period of time (e.g., context-retention time 204) to support transient radio loss events.

In some embodiments, the context-retention controller 102 may receive a disconnection and context-retention request 206 from a base station 104 to trigger entry into a context-retention mode. The base station 104 may generate the disconnection and context-retention request 206 upon an indication of a disconnection of the mobile device 154 from the wireless access network. In some embodiments, the base station 104 may generate the disconnection and context-retention request 206 upon an indication of a disconnection of the mobile device 154 only when context-retention is enabled for the mobile device 154.

In some embodiments, after no transmissions are detected from the mobile device 154 for the predetermined period of time (e.g., context-retention time 204) or after receipt of an indicator from the mobile device 154 of its intention to enter context-retention mode, the base station 104 may trigger the context-retention controller 102 to start context retention and may provide the context-retention controller 102 with context for the mobile device 154. In some DCR mode embodiments, the base station 104 may send a DCR entry request to the context-retention controller 102. The DCR entry request may indicate that the context information is transferred. In some embodiments, the context information in the DCR entry request may be in a predefined format.

Upon receipt of the disconnection and context-retention request 206 from the base station 104, the context-retention controller 102 may send a response 208 to the base station 104 to acknowledge (ACK) entry into the context-retention mode for the mobile device 154. In these embodiments, the base station 104 may respond to receipt of the deregistration request 202 from the mobile device 154 with a deregistration response message 210. The base station 104 may receive a deregistration acknowledgement message 212 from the mobile device, although this is not a requirement.

In some DCR mode embodiments, the base station 104 may respond to the mobile device 154 with an AAI-DREG-RES message when DCR mode was triggered by an AAI-DREG-REQ message with the DCR flag from the mobile device 154.

The base station 104 may inform an anchor gateway 106 that the mobile device 153 is entering context-retention mode and may perform path deregistration for the mobile device 154 by exchanging path deregistration messages 214 for context-retention mode entry. In some embodiments, the context-retention controller 102 may receive a confirmation message 216 from an anchor gateway 106 to confirm that path deregistration for the mobile device 154 has been performed. The context-retention controller 102 may be configured to exchange messages with at least one of an accounting server and a policy server to indicate session suspension for the mobile device 154 while the mobile device 154 is in context-retention mode. In messages 216 through 222, the anchor GW 106 may trigger other components in the network to release resources that were allocated for the mobile device's traffic and handles accounting information up to this point of time.

In some embodiments, confirmation message 216 may include accounting information and may be sent from the anchor gateway 106 to the context-retention controller 102 and acknowledge message 218 may be sent from the context-retention controller 102 to the anchor GW 106 to acknowledge receipt of the DCR confirmation message.

Based on the accounting information, the DCR controller 102 may exchange accounting messages (e.g., stop and session continue messages) with the AAA server 126 in messages 220. In some embodiments, messages 220 may update the AAA server that the current session with the mobile device 154 has been suspended and may allow the mobile device 154 to continue service upon network reentry when the mobile device exits context-retention mode).

In some embodiments, context-retention controller 102 may exchange various session termination messages 222, such as IP-CAN session termination messages, with the PCRF 122. These messages may inform the PCRF 122 that the mobile device 154 will not be receiving traffic in context-retention mode.

Figure 3:
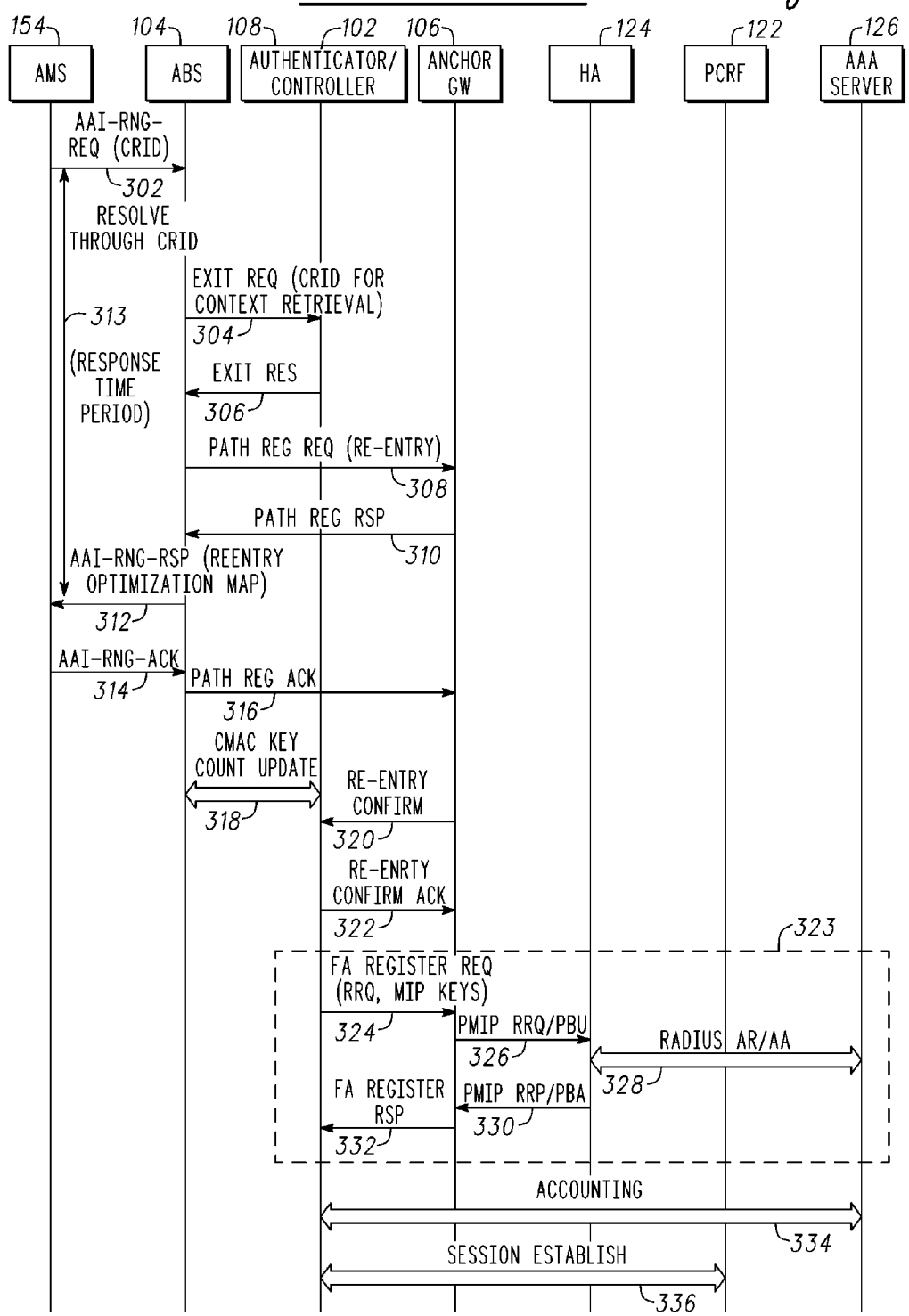
FIG. 3 is a network re-entry procedure in accordance with some embodiments.

FIG. 3 is a network re-entry procedure in accordance with embodiments. Network re-entry procedure 300 describes an exchange of messages between various network components upon re-entry of mobile device, such as mobile device 154 (FIG. 1) into a wireless access network after operating in context-retention mode.

The mobile device 154 may trigger network re-entry by issuing a management message 302 to recover its context. In some embodiments, the management message may be an AAI-RNG-REQ management message requesting context recovery. The message may include the context retention identifier that was assigned to the mobile device 154 at initial network entry.

In response to receipt of the management message 302, the base station 104 may request the context associated with the context retention identifier of the mobile device 154 from the context-retention controller 102. In some embodiments, the context-retention controller 102 may receive a context-retention mode exit request message 304 from the base station. The context-retention mode exit request message 304 may include the context identifier for the mobile station 154. In some DCR mode embodiments, the base station 104 may send a DCR Exit Request message with the CRID for DCR context retrieval to a DCR controller.

The context-retention controller 102 may provide a context-retention mode exit response message 306 to the base station 104 to trigger path registration with the anchor gateway. In some embodiments, the context-retention controller 102 may provide the retained context for the mobile device 154 to the base-station 154 when sending the context-retention mode exit response message 306. In some embodiments, the context-retention mode exit response message 306 may indicate success or failure of context retention. The context-retention mode exit response message 306 may include the context in a predefined format and in some embodiments, may include a re-entry optimization map. In these embodiments, the re-entry optimization map may be used when the network retains only part of the context for the mobile device 154. The re-entry optimization map may indicate to the mobile device 154 what part of the context information was retained. In these embodiments, the mobile device 154 may be configured to reconstruct the context information that was not retained.

In some embodiments, for context-retention, mobile device attributes and parameters may be retained into logical groups. The may allow retention of partial context information allowing the use of an optimization map to indicate which groups of parameters were retained and which were not. In these embodiments, the mobile device 154 may use the optimization map to determine which groups of context information were not retained and may exchange messages with the network to re-negotiate this un-retained context. In some embodiments, the re-entry optimization map may indicate the context items by a type-length-value (TLV), although the scope of the embodiments is not limited in this respect.

In some embodiments, in response to receipt of the context-retention mode exit response message 306, the base station 154 may trigger the generation of a data path to allow the network (either the ASN 152 or the CSN 150) to support data transfer to and from the mobile device 154 by sending a path registration request message 308 indicating network re-entry to the anchor GW 106. The anchor GW 106 may respond to the base station 154 with a path registration response message 310.

The base station 104 may inform the mobile device 154 of successful context retention by sending a response message 312 that includes the re-entry optimization map discussed above. The response message 312 may be in response to the management message 302 sent by the mobile device 154. In some embodiments, the response message 312 may be AAI-RNG-RSP message, although the scope of the embodiments is not limited in this respect. In some embodiments, base station 104 may be required to send the response message 312 within a predetermined response time period 313, although the scope of the embodiments is not limited in this respect.

In some embodiments, if the mobile device 154 does not receive a response message 312 within the predetermined response time period 313, the mobile device 154 may assume that there has been a radio link failure. In that case, the mobile device may re-send the management message 302, although the scope of the embodiments is not limited in this respect. In some WiMAX embodiments, the predetermined response time period 313 may be 200 milliseconds, although the scope of the embodiments is not limited in this respect.

The mobile device 154 may respond to the response message 312 with an acknowledge message 314 to acknowledge receipt of the response message 312. The message 314 may indicate that the mobile device 154 has re-entered the network from context-retention mode and is no longer in context-retention mode. In some embodiments, the mobile device 154 may respond with an AAI-RNG-ACK message to acknowledge receipt of message 312.

Messages 316 through 336 may be used to update the various network components that the mobile device 154 has re-entered the network from context-retention mode so that services, including mobile IP and accounting services, are operational.

The base station 104 may send a path registration acknowledge message 316 to the anchor GW 106 to acknowledge path registration request 310 and to acknowledge that the mobile device's receipt of the e-entry optimization map for network re-entry. The base station 104 and the authenticator 108 may perform a CMAC Key count update procedure by exchanges messages 318. The anchor gateway 106 may send a context-retention mode re-entry confirmation message 320 to the context-retention controller 102. The context-retention controller 102 may send a context-retention re-entry confirmation acknowledgement 322 to the anchor gateway 106 to acknowledge receipt of message 320.

Messages 324 through 332 may be part of a foreign agent (FA) registration process 323. The context-retention controller 102 may send a FA registration request message 324 to the anchor gateway 106. In some example WiMAX embodiments, the registration request may include an RRQ and MIP keys.

The anchor gateway 106 may send a message 326, such as a PMIP RRQ PBU message, to the home agent 124 and the home agent 124 may implement a radius AR/AA with the AAA server 126 by exchanging messages 328.

The home agent 124 may send a message 330, such as a PMIP RRF PBA message, to the anchor gateway 106, and the anchor gateway 106 may send a FA registration response message 332 to the context-retention controller 102. The context-retention controller 102 may exchange accounting information with the AAA server 126 with messages 334 and the context-retention controller 102 may perform a session establishment procedure (e.g., an IP-CAN Session Establishment procedure) with the PCRF with messages 336 to complete session re-establishment.

[Additional Wireless Information]

The context-retention controller 102 (FIG. 1) may include several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

[*Comment: Most of this Next Section if for LTE Support]

Figure 4:
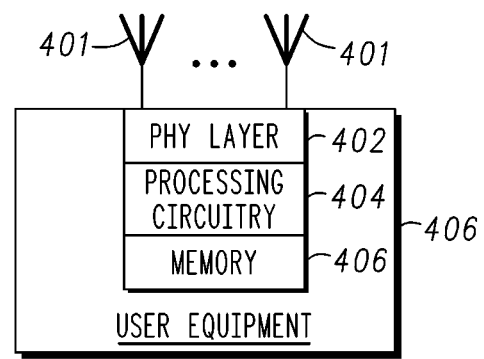
FIG. 4 illustrates a functional block diagram of a UE in accordance with some embodiments.

FIG. 4 illustrates a functional block diagram of a UE in accordance with some embodiments. UE 400 may be suitable for use as mobile device 154 (FIG. 1). The UE 400 may include physical layer circuitry 402 for transmitting and receiving signals to and from eNBs (such as base station 104 (FIG. 1) using one or more antennas 401. UE 400 may also include processing circuitry 404 that may include, among other things a channel estimator. UE 400 may also include memory 406. The processing circuitry may be configured to determine several different feedback values discussed below for transmission to the eNB. The processing circuitry may also include a media access control (MAC) layer.

In some embodiments, the UE 400 may include one or more of a keyboard, a display, a non-volatile memory port, multiple antennas, a graphics processor, an application processor, speakers, and other mobile device elements. The display may be an LCD screen including a touch screen.

The one or more antennas 401 utilized by the UE 400 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to $\frac{1}{10}$ of a wavelength or more.

In some embodiments, the UE 400 may be configured to receive OFDM communication signals over a multicarrier communication channel in accordance with an OFDMA technique. The OFDM signals may comprise a plurality of orthogonal subcarriers. In some LTE embodiments, the basic unit of the wireless resource is the Physical Resource Block (PRB). The PRB may comprise 12 sub-carriers in the frequency domain×0.5 ms in the time domain. The PRBs may be allocated in pairs (in the time domain). In these embodiments, the PRB may comprise a plurality of resource elements (REs). A RE may comprise one subcarrier×one symbol.

Two types of reference signals may be transmitted by an eNB including demodulation reference signals (DM-RS), channel state information reference signals (CIS-RS) and/or a common reference signal (CRS). The DM-RS may be used by the UE for data demodulation. The reference signals may be transmitted in predetermined PRBs.

In some embodiments, the OFDMA technique may be either a frequency domain duplexing (FDD) technique that uses different uplink and downlink spectrum or a time-domain duplexing (TDD) technique that uses the same spectrum for uplink and downlink.

In some other embodiments, the UE 400 and the eNBs may be configured to communicate signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, the UE 400 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some LTE embodiments, the UE 400 may calculate several different feedback values which may be used to perform channel adaption for closed-loop spatial multiplexing transmission mode. These feedback values may include a channel-quality indicator (CQI), a rank indicator (RI) and a precoding matrix indicator (PMI). By the CQI, the transmitter selects one of several modulation alphabets and code rate combinations. The RI informs the transmitter about the number of useful transmission layers for the current MIMO channel, and the PMI indicates the codebook index of the precoding matrix (depending on the number of transmit antennas) that is applied at the transmitter. The code rate used by the eNB may be based on the CQI. The PMI may be a vector that is calculated by the UE and reported to the eNB. In some embodiments, the UE may transmit a physical uplink control channel (PUCCH) of format 2, 2a or 2b containing the CQI/PMI or RI.

In these embodiments, the CQI may be an indication of the downlink mobile radio channel quality as experienced by the UE 400. The CQI allows the UE 400 to propose to an eNB an optimum modulation scheme and coding rate to use for a given radio link quality so that the resulting transport block error rate would not exceed a certain value, such as 10%. In some embodiments, the UE may report a wideband CQI value which refers to the channel quality of the system bandwidth. The UE may also report a sub-band CQI value per sub-band of a certain number of resource blocks which may be configured by higher layers. The full set of sub-bands may cover the system bandwidth. In case of spatial multiplexing, a CQI per code word may be reported.

In some embodiments, the PMI may indicate an optimum precoding matrix to be used by the eNB for a given radio condition. The PMI value refers to the codebook table. The network configures the number of resource blocks that are represented by a PMI report. In some embodiments, to cover the system bandwidth, multiple PMI reports may be provided. PMI reports may also be provided for closed loop spatial multiplexing, multi-user MIMO and closed-loop rank 1 precoding MIMO modes.

In some cooperating multipoint (CoMP) embodiments, the network may be configured for joint transmissions to a UE in which two or more cooperating/coordinating points, such as remote-radio heads (RRHs) transmit jointly. In these embodiments, the joint transmissions may be MIMO transmissions and the cooperating points are configured to perform joint beamforming.

[Copy Later Claims Here]

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A context-retention controller to operate within a wireless access network, the context-retention controller comprising:
    a hardware processing circuit configured to:
    assign a context identifier to a mobile device at network entry for context retention;
    maintain context for the mobile device after disconnection from the wireless access network; and
    identify the mobile device by the assigned context identifier for retrieval of the context at network reentry of the mobile device,
    wherein the context-retention controller is configured to maintain the context for the mobile device when the mobile device is disconnected unintentionally from the wireless access network or when the mobile device disconnects intentionally from the wireless access network, and
    wherein disconnection from the wireless access network triggers the context-retention controller to retain context,
    wherein the context-retention controller is further configured to:
    receive a disconnection and context-retention request from a base station to trigger entry into a context-retention mode, the base station to generate the disconnection and context-retention request upon an indication of a disconnection of the mobile device from the wireless access network; and
    respond to the base station to acknowledge entry into the context-retention mode for the mobile device.

2. The context-retention controller of claim 1 wherein the context includes device parameters and authentication information to enable faster network re-entry, and
   wherein the indication of disconnection of the mobile device from the wireless access network includes either receipt of a deregistration request from the mobile device or upon a determination of radio link failure by the base station.

3. The context-retention controller of claim 2 wherein the context-retention controller is a Deregistration with Context Retention (DCR) mode controller that is configured to maintain context for the mobile device after deregistration of the mobile device when entering into the context-retention mode.

4. The context-retention controller of claim 3 wherein the wireless access network is a WiMAX configured network,
   wherein the context-retention mode is a DCR mode;
   wherein the context identifier is a context retention identifier (CRID), and
   wherein the DCR mode controller is configured to maintain the context for the mobile device after the mobile device enters DCR mode.

5. The context-retention controller of claim 2 wherein the wireless access network is a 3GPP LTE configured network,
   wherein the context-retention controller operates as part of a Discontinuous Reception (DRX) mode controller,
   wherein the context-retention mode includes a discontinuous reception (DRX) mode;
   wherein the mobile device is a user equipment (UE), and
   wherein the DRX mode controller is configured to maintain the context for the UE until after the mobile device enters DRX mode.

6. The context-retention controller of claim 2 wherein the context-retention controller is configured to maintain the context for the mobile device for at least a predetermined period of time to support transient radio loss events.

7. The context-retention controller of claim 2 wherein the context-retention controller is configured to receive a confirmation message from an anchor gateway to confirm that path deregistration for the mobile device has been performed, and
   wherein the context-retention controller is further configured to exchange messages with at least one of an accounting server and a policy server to indicate session suspension for the mobile device while the mobile device is in context-retention mode.

8. The context-retention controller of claim 7 further configured to:
   receive a context-retention mode exit request message from the base station, the context-retention mode exit request message including the context identifier;
   provide a response message to the base station to trigger path registration with the anchor gateway; and
   provide the retained context to the base station for network reentry of the mobile station,
   wherein the context-retention controller is configured to exchange messages with at least one of the accounting server and the policy server to indicate session re-establishment for the mobile device.

9. The context-retention controller of claim 8 further configured to provide a re-entry optimization map to indicate to the mobile device items of context that were retained.

10. The context-retention controller of claim 2 further arranged to:
    generate the context identifier when the mobile device initially connects to the wireless access network and provide the context identifier to the mobile device; and
    receive the context from the base station; and
    store the context in a context-retention database,
    wherein the context-retention database associates context for a mobile device with a context identifier for the mobile device.

11. The context-retention controller of claim 10 wherein the base station is configured to determine the context for the mobile device after the mobile device initially connects to and registers with the wireless access network, and
    wherein the context-retention controller is configured to receive updates to the context from the base station while the mobile device is connected to the wireless access network.

12. A method performed by a context-retention controller operating in a wireless network for improved network reentry, the method comprising:
    assigning a context identifier to a mobile device at network entry for context retention;
    receiving a disconnection and context-retention request from a base station to trigger entry of the mobile station into a context-retention mode, the base station to generate the disconnection and context-retention request upon an indication of a disconnection of the mobile device from the wireless access network;
    responding to the base station to acknowledge entry into the context-retention mode for the mobile device;
    maintaining context for the mobile device in a context-retention database after disconnection of the mobile device from the wireless access network;
    receiving a context-retention mode exit request message from the base station that includes the context identifier for retrieval of the context at network reentry of the mobile device; and
    identifying the mobile device by the assigned context identifier for retrieval of the context at network reentry of the mobile device,
    wherein the context-retention controller is configured to maintain the context for the mobile device when the mobile device is disconnected unintentionally from the wireless access network or when the mobile device disconnects intentionally from the wireless access network.

13. The method of claim 12 wherein the disconnection and context-retention request is generated by the base station when the mobile device enters into a power management mode.

14. The method of claim 13 wherein in response to the context-retention mode exit request message, the method includes:
    providing a response message to the base station to trigger path registration with the anchor gateway; and
    providing the retained context to the base station for network reentry of the mobile station.

15. A context-retention controller comprising:
    processing circuitry configured to assign a context identifier to a mobile device at network entry for context retention; and
    interface circuitry configured to receive a disconnection and context-retention request from a base station to trigger entry of the mobile station into a context-retention mode, the base station to generate the disconnection and context-retention request upon an indication of a disconnection of the mobile device from the wireless access network,
    wherein the processing circuitry is configured to maintain context for the mobile device in a context-retention database after disconnection of the mobile device from the wireless access network,
    wherein the interface circuitry is configured to receive a context-retention mode exit request message from the base station that includes the context identifier for retrieval of the context at network reentry of the mobile device, wherein the processing circuitry is further configured to identify the mobile device by the assigned context identifier for retrieval of the context at network reentry of the mobile device and respond to the base station to acknowledge entry into the context-retention mode for the mobile device, wherein the context-retention controller is configured to maintain the context for the mobile device when the mobile device is disconnected unintentionally from the wireless access network or when the mobile device disconnects intentionally from the wireless access network.

16. The context-retention controller of claim 15 wherein the disconnection and context-retention request is generated by the base station when the mobile device enters into a power management mode to reduce energy consumption.

17. The context-retention controller of claim 15 wherein in response to the context-retention mode exit request message, the interface circuitry is configured to:

provide a response message to the base station to trigger path registration with the anchor gateway; and provide the retained context to the base station for network reentry of the mobile station.

* * * * *